(12) United States Patent
Jun et al.

(10) Patent No.: US 12,557,399 B2
(45) Date of Patent: Feb. 17, 2026

(54) PHOTOVOLTAIC MODULE INCLUDING IMPACT ABSORPTION STRUCTURE

(71) Applicant: KOREA UNIVERSITY RESEARCH AND BUSINESS FOUNDATION, Seoul (KR)

(72) Inventors: Yongseok Jun, Seoul (KR); Yoonmook Kang, Seoul (KR); Chanyong Lee, Seoul (KR); Chang Hyun Lee, Seongnam-si (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 24 days.

(21) Appl. No.: 18/571,531

(22) PCT Filed: Jun. 14, 2022

(86) PCT No.: PCT/KR2022/008355
§ 371 (c)(1),
(2) Date: Dec. 18, 2023

(87) PCT Pub. No.: WO2022/265336
PCT Pub. Date: Dec. 22, 2022

(65) Prior Publication Data
US 2024/0405139 A1    Dec. 5, 2024

(30) Foreign Application Priority Data

Jun. 16, 2021    (KR) ........................ 10-2021-0077742

(51) Int. Cl.
*H10F 19/80*    (2025.01)

(52) U.S. Cl.
CPC ................................... *H10F 19/80* (2025.01)

(58) Field of Classification Search
CPC ....................................................... H10F 19/80
See application file for complete search history.

(56) References Cited

U.S. PATENT DOCUMENTS

2012/0171800 A1     7/2012  Cheng et al.
2015/0287856 A1*   10/2015  Kauffman ............. H10F 19/807
                                                                                 136/251

FOREIGN PATENT DOCUMENTS

| JP | 2017-037923 A | 2/2017 |
| KR | 10-2008-0020351 A | 3/2008 |
| KR | 10-2011-0000773 A | 1/2011 |
| KR | 10-2011-0074304 A | 6/2011 |
| KR | 10-2011-0074306 A | 6/2011 |
| KR | 10-2012-0051972 A | 5/2012 |
| KR | 10-2012-0113206 A | 10/2012 |
| KR | 10-2013-0050449 A | 5/2013 |

(Continued)

OTHER PUBLICATIONS

Translation of International Search Report for counterpart Korean Patent Application No. PCT/KR2022/008355. (2 Pages English).

*Primary Examiner* — Devina Pillay
(74) *Attorney, Agent, or Firm* — NSIP Law

(57) ABSTRACT

Disclosed is a photovoltaic module including an encapsulation part, a plurality of solar cells disposed in the encapsulating part such that angles thereof with respect to a height direction of the encapsulation part is 30 degrees to 90 degrees, and impact absorption parts disposed between the plurality of solar cells in the encapsulation part.

2 Claims, 8 Drawing Sheets

(56) References Cited

FOREIGN PATENT DOCUMENTS

| | | |
|---|---|---|
| KR | 10-2014-0122323 A | 10/2014 |
| KR | 10-2015-0006950 A | 1/2015 |
| KR | 10-2021-0025235 A | 3/2021 |
| KR | 10-2021-0103656 A | 8/2021 |
| KR | 10-2021-0103658 A | 8/2021 |
| KR | 10-2021-0106682 A | 8/2021 |
| KR | 10-2021-0112466 A | 9/2021 |
| KR | 10-2021-0143408 A | 11/2021 |
| KR | 10-2021-0148700 A | 12/2021 |
| KR | 10-2022-0150594 A | 11/2022 |
| KR | 10-2022-0150732 A | 11/2022 |
| KR | 10-2022-0166520 A | 12/2022 |
| KR | 10-2023-0007660 A | 1/2023 |
| WO | WO 2019/065606 A1 | 4/2019 |

\* cited by examiner

External force

PHOTOVOLTAIC MODULE INCLUDING IMPACT ABSORPTION STRUCTURE

CROSS REFERENCE TO RELATED APPLICATIONS

This application is a U.S. National Stage Application of International Application No. PCT/KR2022/008355, filed on Jun. 14, 2022, which claims the benefit under 35 USC 119(a) and 365(b) of Korean Patent Application No. 10-2021-0077742, filed on Jun. 16, 2021, in the Korean Intellectual Property Office, the entire disclosure of which is incorporated herein by reference for all purposes.

TECHNICAL FIELD

The present disclosure relates to a photovoltaic module including an impact absorption structure.

The present disclosure is derived from the research conducted as part of the Ministry of Trade, Industry and Energy's new and renewable energy core technology development (R&D) (Project identification number: 1415169068, Research management agency: Korea Institute of Energy Technology Evaluation and Planning, Research project name: Development of a transparent solar cell platform that is easy to expand, Host organization: Korea University Industry-Academic Cooperation Foundation, research period: Mar. 1, 2022 to Dec. 31, 2022, contribution rate: 1/1).

Meanwhile, there is no property interest of the Korean government in any aspect of the present disclosure.

BACKGROUND ART

An element that converts energy of photons generated from the sun into electrical energy through a photoelectric effect is called a solar cell, and an assembly of two or more solar cells connected in series or parallel in a single circuit is called a photovoltaic module.

A core material of solar cells may be referred to as a light absorption layer that exhibits a photoelectric effect, and the material include silicon, copper indium gallium selenide (CIGS), cadmium telluride (CdTe), a III-V group element composite material, a photoactive organic material, perovskite, and quantum dots.

In general, a solar power system is a system that converts light energy into electrical energy by using solar cells, and is used as an independent power source for general homes or industrial purposes, or as an auxiliary power source in connection with a commercial AC power system.

The solar cell is manufactured by a p-n junction of semiconductor materials, and uses a photovoltaic effect, which causes a small amount of currents to flow when receiving light, and most ordinary solar cells include a p-n junction diode of a larger area, and when an electromotive force generated at opposite ends of the p-n junction diode is connected to an external circuit, the diode acts as a unit solar cell. Because the electromotive force of the solar cell as described above is small, it is used by connecting multiple solar cells to form a photovoltaic module with an appropriate electromotive force.

Grid-connected solar power systems, which are commonly used on the exteriors of buildings, include a plurality of solar cell arrays that convert solar energy into electrical energy, and DC power, which is the electrical energy obtained from the solar cell arrays through conversion, and an inverter that converts DC power to AC power and supplies it to users.

In the solar power system, installation of solar cell arrays, which are installed to obtain solar energy, is the most important element in constituting the system, and the solar cell arrays are installed on a separately secured site or on the roof of a building.

Accordingly, a separate space has to be secured to install a solar power system in a building, and because a cooling tower that constitutes a cooling apparatus is typically installed on the rooftop of a building, a space for installing a solar cell array is narrow and limited whereby installation of the solar cell array is limited and an installation work becomes difficult.

To compensate for these shortcomings, there are cases, in which solar power systems are applied to window systems installed for lighting and ventilation of buildings.

However, the conventional solar power system has a complicated installation structure, making installation and expansion thereof difficult.

DETAILED DESCRIPTION OF THE INVENTION

Technical Problem

The present disclosure provides a photovoltaic module having an improved impact-resistant property to an external impact.

The present disclosure provides a photovoltaic module that has solar cells, of which angles with respect to a height direction (the "Z" axis direct) are 30 degrees to 90 degrees, and may be prevented from being damaged by an external force.

Meanwhile, the technical problems sought to be achieved in the present disclosure are not limited to the technical problems mentioned above, and other technical problems not mentioned may be clearly understood by those skilled in the art, to which the present disclosure pertains, from the description below.

Technical Solution

According to an aspect of the present disclosure, a photovoltaic module includes an encapsulation part, a plurality of solar cells disposed in the encapsulating part such that angles thereof with respect to a height direction of the encapsulation part is 30 degrees to 90 degrees, and impact absorption parts disposed between the plurality of solar cells in the encapsulation part.

Furthermore, a modulus of elasticity of the impact absorption parts may be higher than a modulus of elasticity of the solar cells.

According to another aspect of the present disclosure, a photovoltaic module includes an encapsulation part, a plurality of solar cells disposed in the encapsulating part such that angles thereof with respect to a height direction of the encapsulation part is 30 degrees to 90 degrees, first impact absorption parts disposed between the plurality of solar cells in the encapsulation part, and a second impact absorption part disposed on at least one of one side surface and an opposite side surface of the encapsulation part.

Furthermore, the second impact absorption part may include a substrate disposed at least one of the one side surface and the opposite side surface of the encapsulation part, and an impact absorption layer disposed on an outer surface of the substrate.

Furthermore, moduli of elasticity of the first impact absorption part and the second impact absorption parts may be higher than a modulus of elasticity of the solar cells.

Furthermore, an outer surface of the second impact absorption part may have a curvature.

According to another aspect of the present disclosure, a photovoltaic module includes an encapsulation part, a plurality of solar cells disposed in the encapsulating part such that angles thereof with respect to a height direction of the encapsulation part is 30 degrees to 90 degrees, and impact absorption parts connecting the plurality of solar cells in the height direction and a horizontal direction being perpendicular to the height direction, in the encapsulation part.

Furthermore, the photovoltaic module may further include extension parts disposed at opposite ends of the plurality of solar cells, the impact absorption parts may pass through the extension parts to connect the plurality of solar cells, and the solar cells being adjacent to each other may be rotatable about the impact absorption parts when an external force is applied thereto.

Furthermore, the photovoltaic module may further include conductors disposed in the impact absorption parts, and electrically connecting the adjacent solar cells, and the plurality of adjacent solar cells may be connected to each other in series or in parallel through the conductors.

Advantageous Effects of the Invention

According to the embodiment of the present disclosure, it is possible to achieve an improved impact-resistant property to an external impact.

Meanwhile, the effects that may be obtained from the present disclosure are not limited to the effects mentioned above, and other effects not mentioned may be clearly understood by those skilled in the art, to which the present disclosure pertains, from the description below.

BEST MODE

Figure 1:
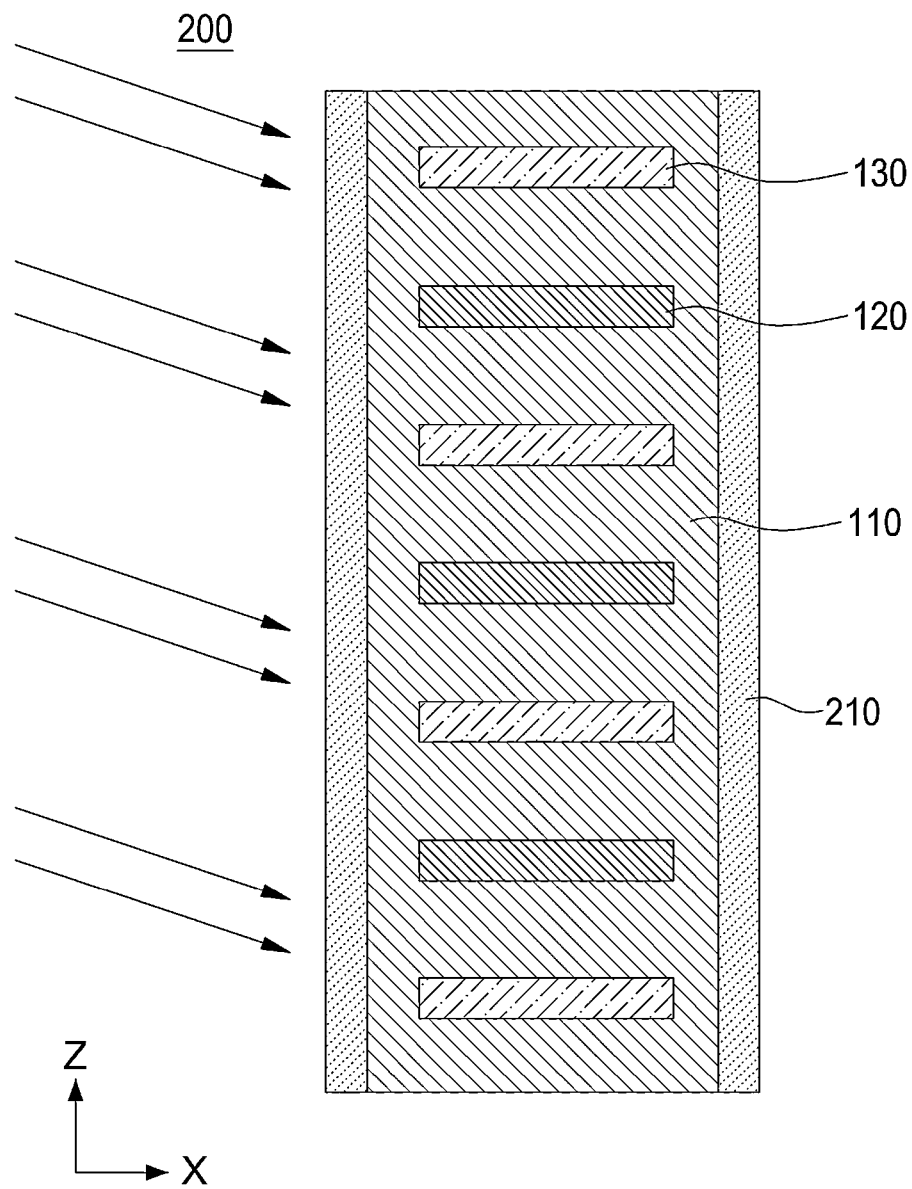
FIG. 1 schematically illustrates a photovoltaic module according to a first embodiment of the present disclosure.

Hereinafter, embodiments of the present disclosure will be described in more detail with reference to the attached drawings. The embodiments of the present disclosure may be modified in various forms, and the scope of the present disclosure should not be construed as being limited to the following embodiments. The embodiments are provided to more completely describe the present disclosure to those skilled in the art. Therefore, the shapes of elements in the drawings are exaggerated to emphasize clearer description.

The configuration of the invention to clarify the solution to the problem to be solved by the present disclosure will be described in detail with reference to the accompanying drawings based on preferred embodiments of the present disclosure, and the reference numerals to the components in the drawings will be the same even if they are in different drawings, and it is stated in advance that the components of other drawings may be cited if necessary when describing the relevant drawings.

FIG. 1 schematically illustrates a photovoltaic module according to a first embodiment of the present disclosure.

First, referring to FIG. 1, a photovoltaic module 100 according to the first embodiment of the present disclosure may include an encapsulation part 110, solar cells 120, and impact absorption parts 130.

In the photovoltaic module 100 according to the first embodiment of the present disclosure, a plurality of solar cells 120 having a width in a first direction (the "X" axis direction) may be inserted into and fixed to the encapsulation part 110, and may be disposed to be spaced apart from each other in a second direction (the "Z" axis direction).

It is preferable that the encapsulation part 110 is transparent, is flexible such that a shape thereof may be easily deformed, or is formed of a material that is cured by heat or ultraviolet (UV) light.

For example, the encapsulation part 110 may be formed of an EVA material. However, in the present disclosure, the encapsulation part 110 is not limited to the EVA, and all materials that may be used as the encapsulation part of the photovoltaic module may be used.

Meanwhile, the encapsulation part 110 may prevent corrosion due to penetration of moisture, and may protect the plurality of solar cells 120 from an impact. The encapsulation part 110 may be formed of a material, such as ethylene vinyl acetate (EVA), polyolefin (PO), an ionomer, polyvinyl butyral (PVB), an acrylic resin, or a silicone resin.

In the encapsulation part 110, the plurality of solar cells 120 may be disposed to be spaced apart from each other, and the encapsulation part 110 may surround front surfaces of the solar cells 120.

Here, the solar cells 120 may have a shape having a thickness and a length.

For example, as the solar cells 120, thin film type solar cells 120 having a thickness of 10 nm to 10 μm may be applied or silicon solar cells 120 having a thickness of 50 to 300 μm may be applied.

In detail, the types of the solar cells 120 applied in the present disclosure are not limited, and the silicon solar cells and the like may be applied in the present disclosure.

That is, the silicon solar cells may be variously classified depending on the type and the structure of a used substrate, and may be classified into multicrystalline silicon solar cells and monocrystalline silicon solar cells depending on crystal characteristics of a light absorption layer.

The monocrystalline solar cells that are representative silicon solar cells are solar cells, in which the substrate is a monocrystalline silicon water. In addition, the silicon solar cells may be manufactured with a multi-junction structure, such as a double junction structure (tandem), in which a solar cell that absorbs light of a different wavelength is laminated on another silicon solar cell, or a triple junction structure, in which a solar cell that absorbs light of another wavelength is further laminated thereon, or may be manufactured with a hybrid structure whereby a conversion efficiency is increased a level of a typical silicon solar cell or more.

Meanwhile, in the first embodiment, it is illustrated that the plurality of solar cells 120 are disposed in parallel to each other, but angle of the solar cells 120 with respect to the height direction (the "Z" axis direction) may be 30 degrees or 90 degrees.

Here, it is preferable that a shape of the encapsulation part 110 does not return to an original shape when it is cured and an external force is removed therefrom after being bent to a set shape. Of course, the shape may not return to the original shape when the external force is removed, with no curing process, depending on a material of the encapsulation part 110.

The impact absorption parts 130 may be disposed between the solar cells 120 disposed to be spaced apart from each other in the height direction (the "Z" axis direction).

Here, in the photovoltaic module 100, the number of the impact absorption parts 130 may be the same as the number of the solar cells 120, or may be smaller or larger by one.

It is preferable that a width of the impact absorption parts 130 may be larger than a width of the solar cells 120 in the horizontal direction (the "X" axis direction). Through this, an external force applied in the horizontal direction (the "X" axis direction) may be delivered to the impact absorption parts 130 and may be offset. That is, the external force may be offset in the impact absorption parts 130 before being applied to the solar cells 120.

Meanwhile, the impact absorption parts 130 may have an elastic body form of a spring, sponge, or a foam form, and may have various materials and shapes, by which the external impact may be absorbed or offset. Here, the impact absorption parts 130 may be formed of a material having a high modulus of elasticity as compared with the solar cells 120, and may offset the external impact by absorbing it.

Meanwhile, the impact absorption parts 130 may reflect or refract incident light. Through this, the light may be delivered to the adjacent solar cells 120 to improve a photovoltaic efficiency.

Figure 2:
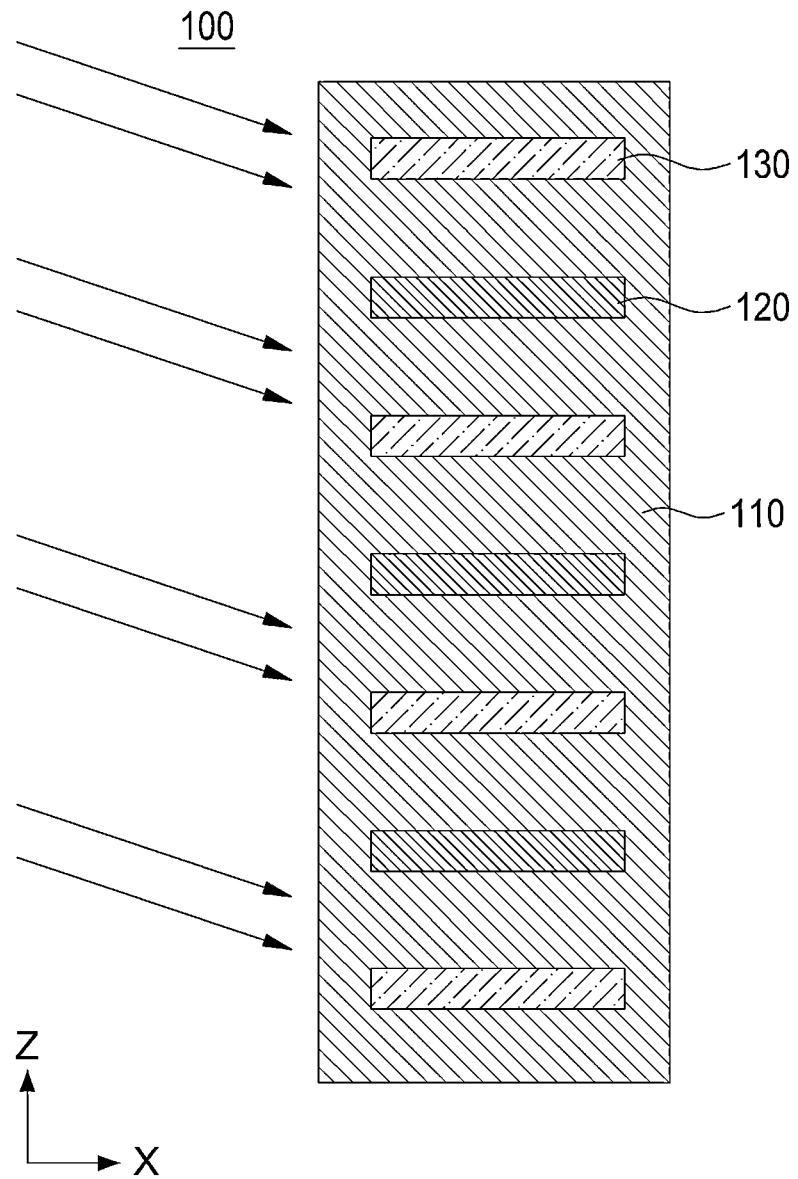
FIG. 2 schematically illustrates a photovoltaic module according to a second embodiment of the present disclosure.

FIG. 2 schematically illustrates a photovoltaic module according to a second embodiment of the present disclosure.

Referring to FIG. 2, a configuration of the photovoltaic module 200 according to the second embodiment is different from that of the photovoltaic module 100 according to the first embodiment illustrated in FIG. 1, in an aspect of a configuration of a second impact absorption part 210, and the second impact absorption part 210 will be described later in detail in a description of the photovoltaic module 200 according to the second embodiment.

Hereinafter, in the description of the photovoltaic module 200 according to the second embodiment, the impact absorption parts 130 disposed between the solar cells 120 may be described as first impact absorption parts 130.

The second impact absorption part 210 may be disposed on at least one of a front surface and a rear surface of the encapsulation part 110, and it is preferable that a transparency of the second impact absorption part 210 is higher when it is disposed on the front surface, to which the light is input.

The second impact absorption part 210 may be formed of an elastic body form of a spring, sponge, or a foam form, and may have various materials and shapes, by which the external impact may be absorbed or offset.

Here, the impact absorption parts 130 and the second impact absorption part 210 may be formed of a material having a high modulus of elasticity as compared with the solar cells 120 to absorb and offset the external impact.

That is, the photovoltaic module 200 including the first impact absorption parts 130 and the second impact absorption part 210 together may absorb the external impact more effectively, and may offset it.

Figure 3:
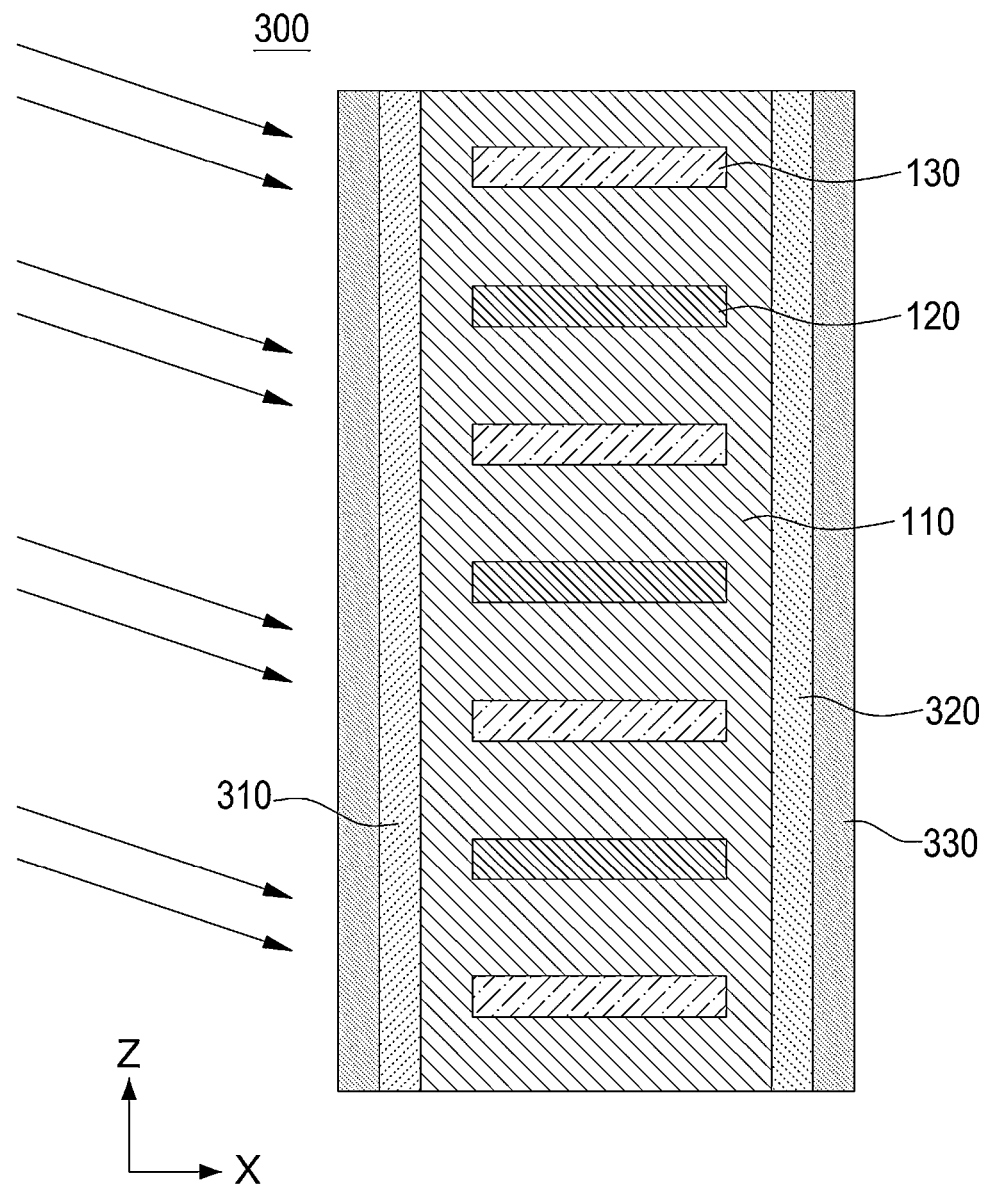
FIG. 3 schematically illustrates a photovoltaic module according to a third embodiment of the present disclosure.

FIG. 3 schematically illustrates a photovoltaic module according to a third embodiment of the present disclosure.

Referring to FIG. 3, a configuration of a photovoltaic module 300 according to the third embodiment is different from that of the photovoltaic module 100 according to the first embodiment illustrated in FIG. 1, in an aspect of configurations of a first substrate 310, a second substrate 320, and a second impact absorption part 330, and the first substrate 310, the second substrate 320, and the second impact absorption part 330 will be described in detail later in the description of the photovoltaic module 300 according to the third embodiment.

Hereinafter, in the description of the photovoltaic module 300 according to the third embodiment, the impact absorption parts 130 disposed between the solar cells 120 may be described as first impact absorption parts 130.

The first substrate 310 and the second substrate 320 may be disposed on a front side and a rear side of the encapsulation part 110, respectively.

Because the first substrate 310 is formed in the form of a film and is disposed on a rear side of the module, it serves to protect the solar cells from an external environment by preventing moisture, contaminants, ultraviolet rays, and the like from being introduced to the rear surface of the module to prevent flow of electricity or heat. Accordingly, the first substrate 310 may be formed of a material having a climate-resistant property, a moisture-resistant property, an insulation-resistant property, or a durability, such as an ultraviolet ray interrupting property, which may endure well in a high-temperature/high humidity, a high voltage, a strong ultraviolet ray, and the like.

The first substrate 310 may have a multilayered structure, such as a layer for preventing penetration of moisture and oxygen, a layer for preventing chemical corrosion, and a layer having insulation characteristics, and as an example, may be formed of any one of polyvinyl fluoride (PVF), polyvinylidene fluoride (PVDF), polyethylene terephthalate (PET), poly(methyl methacrylate) (PMMA), low iron tempered glass.

However, the first substrate 310 is not limited to the materials, and may be formed of a transparent substrate like the second substrate 320.

The second substrate 320 may be formed in the form of a film and may be disposed on a front side of the module, and may be formed of tempered glass with a high transmittance and an excellent damage prevention function to transmit the incident light, or may be formed of a high-transmission fluorine film.

Then, the tempered glass may be low iron tempered glass having a low content of iron substances.

The second impact absorption part 330 may be disposed on at least one of a front surface of the first substrate 310 and a rear surface of the second substrate 320, and it is preferable that a transparency of the second impact absorption part 330 is high when it is disposed on the front surface, to which the light is input.

The second impact absorption part 330 may be formed of an elastic body form of a spring, sponge, or a foam form, and may have various materials and shapes, by which the external impact may be absorbed or offset.

Here, the first impact absorption parts 130 and the second impact absorption part 330 may be formed of a material having a high modulus of elasticity as compared with the solar cells 120 to absorb and offset the external impact.

That is, the photovoltaic module 300 including the first impact absorption parts 130 and the second impact absorption part 330 together may absorb the external impact more effectively, and may offset it.

Figure 4:
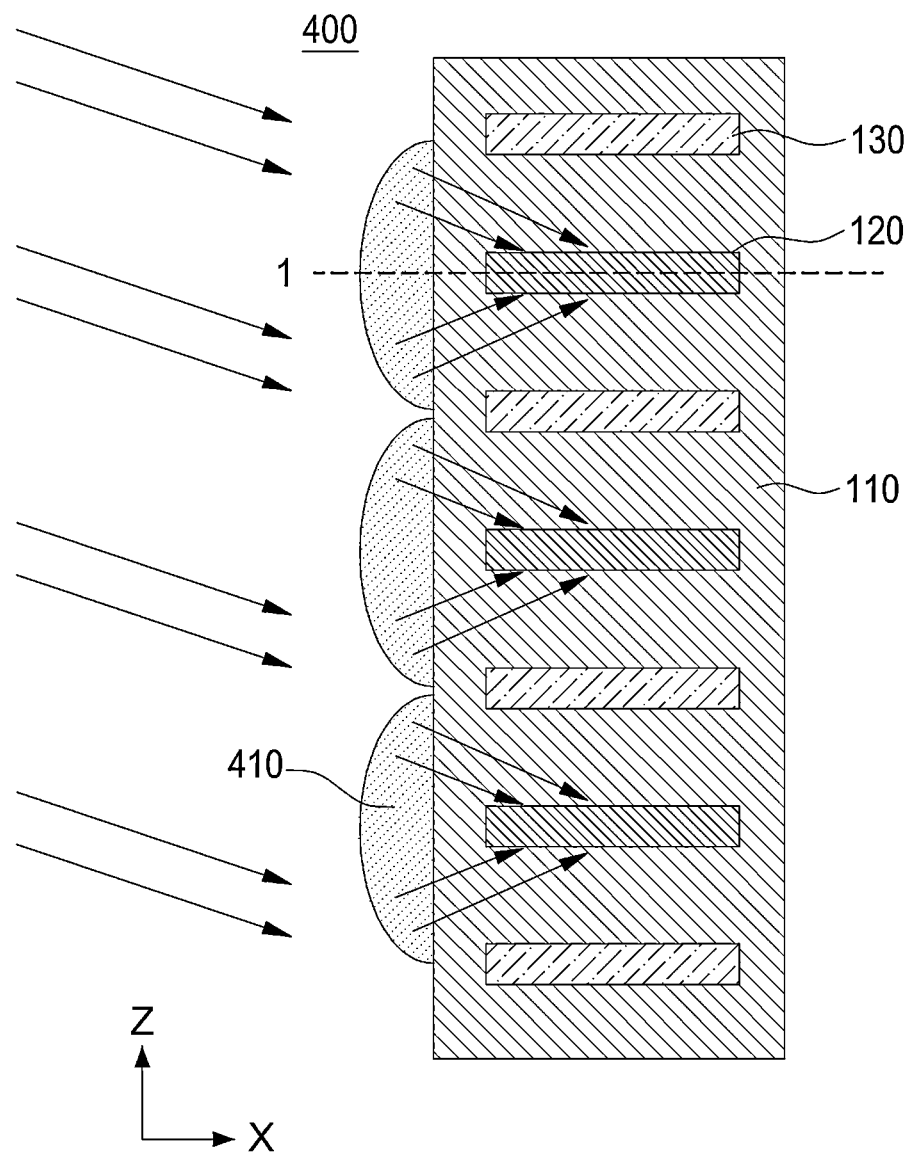
FIG. 4 schematically illustrates a photovoltaic module according to a fourth embodiment of the present disclosure.

FIG. 4 schematically illustrates a photovoltaic module according to a fourth embodiment of the present disclosure.

Referring to FIG. 4, a configuration of a photovoltaic module 400 according to the fourth embodiment is different from that of the photovoltaic module 100 according to the first embodiment illustrated in FIG. 1, in an aspect of configurations of a second impact absorption part 410, and the second impact absorption part 410 will be described in detail later in the description of the photovoltaic module 400 according to the fourth embodiment.

Hereinafter, in the description of the photovoltaic module 400 according to the fourth embodiment, the impact absorption parts 130 disposed between the solar cells 120 may be described as first impact absorption parts 130.

The second impact absorption part 410 may be disposed on a front surface of the encapsulation part 110, may have a transparency, may be formed of an elastic body form of a spring, sponge, or a foam form, and may have various materials and shapes, by which the external impact may be absorbed or offset.

Here, the second impact absorption part 410 may have a curvature on an outer surface thereof, the second impact absorption part 410 may have the same number of solar cells 120, and an inflection point on a curved surface of the second impact absorption part 410 may be located on the same line as the centers 1 of the solar cell 120.

Through this, the incident light may be refracted through the second impact absorption part 410 to be input in directions of the upper surfaces and the lower surfaces of the solar cells 120.

Here, the first impact absorption parts 310 and the second impact absorption part 410 may be formed of a material having a high modulus of elasticity as compared with the solar cells 120 to absorb and offset the external impact.

That is, the photovoltaic module 400 including the first impact absorption parts 130 and the second impact absorption part 410 together may absorb the external impact more effectively, and may offset it, and may improve a photovoltaic efficiency in the solar cells 120 by refracting the incident light.

FIGS. 5 to 8 schematically illustrate a photovoltaic module according to a fifth embodiment of the present disclosure.

Figure 5:
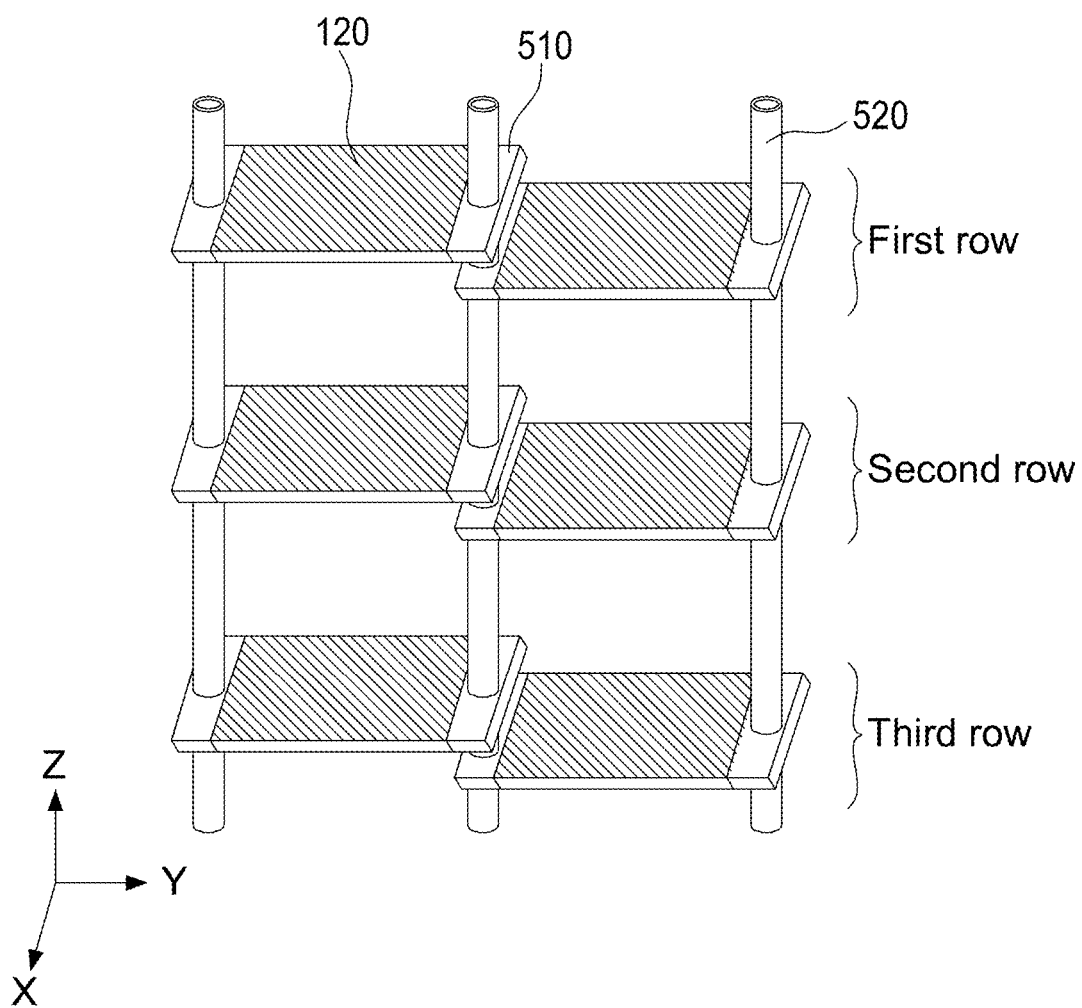
FIGS. 5 to 8B schematically illustrate a photovoltaic module according to a fifth embodiment of the present disclosure.
Figure 6:
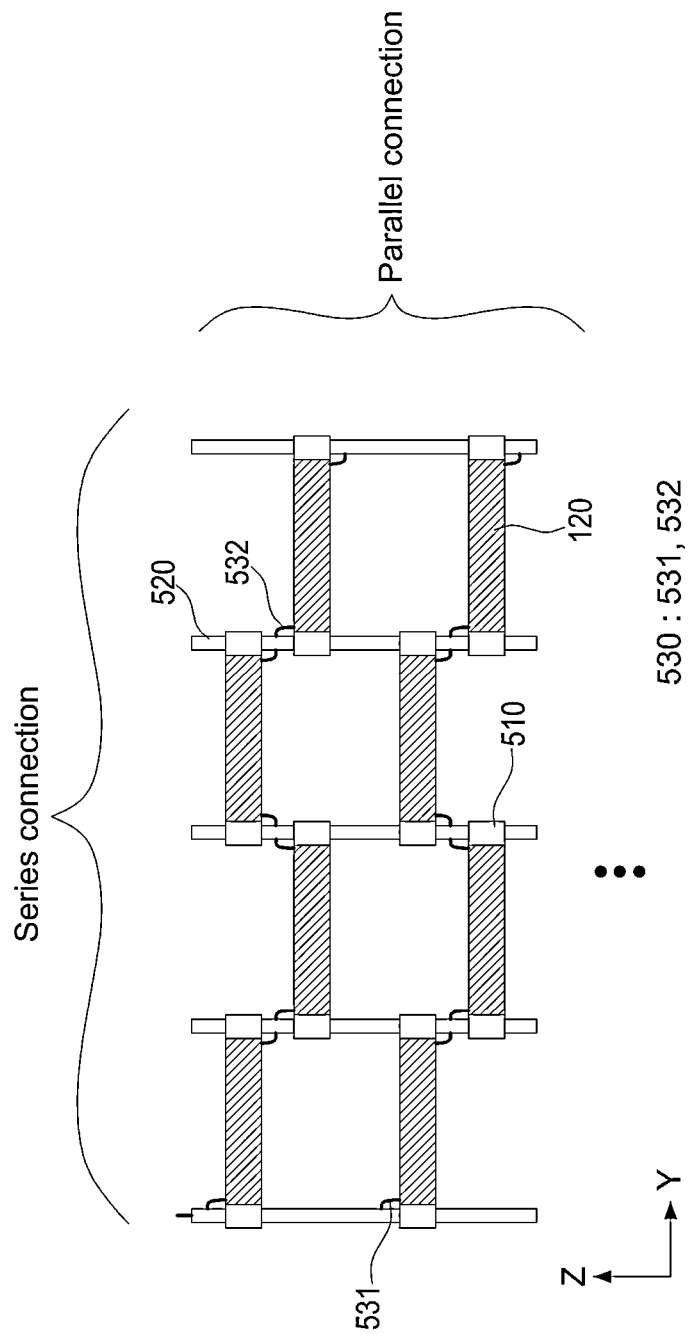
Figure 7:
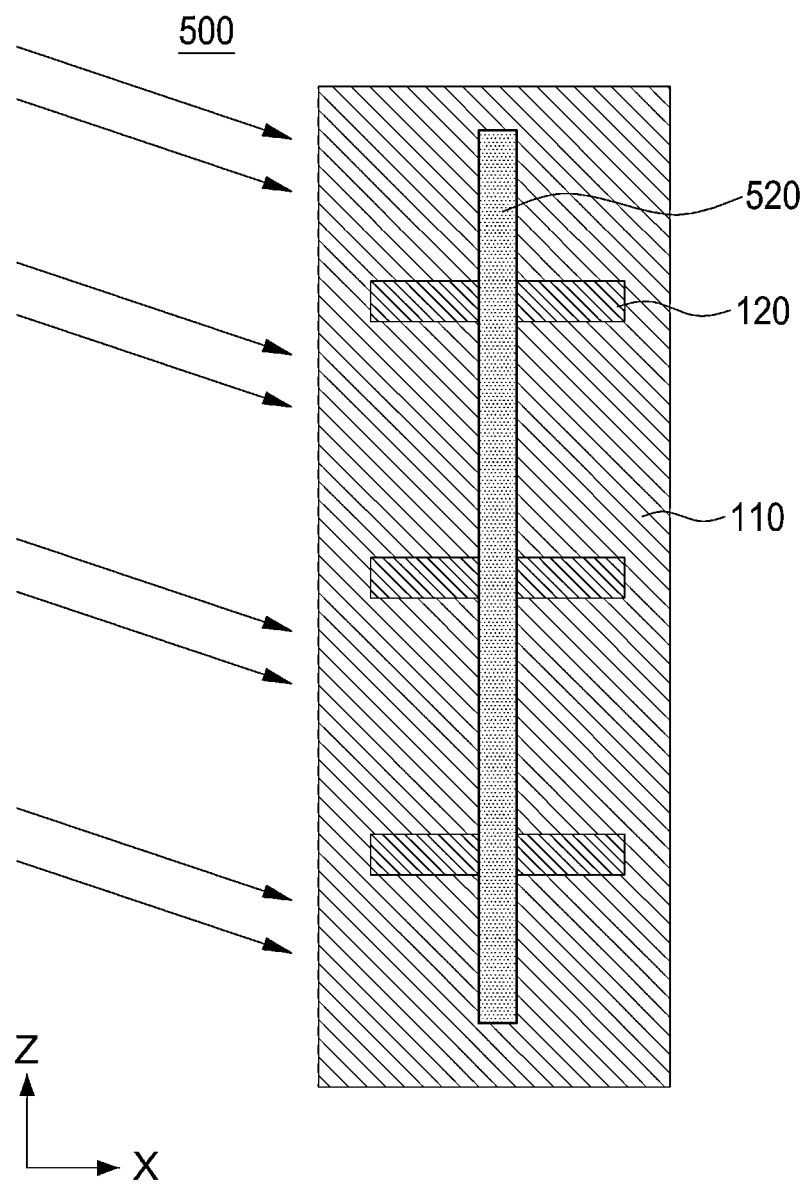
Figure 8A:
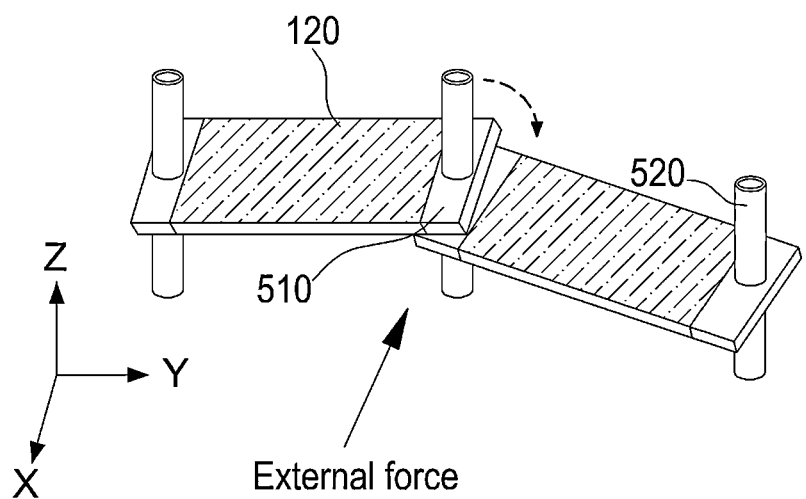
Figure 8B:
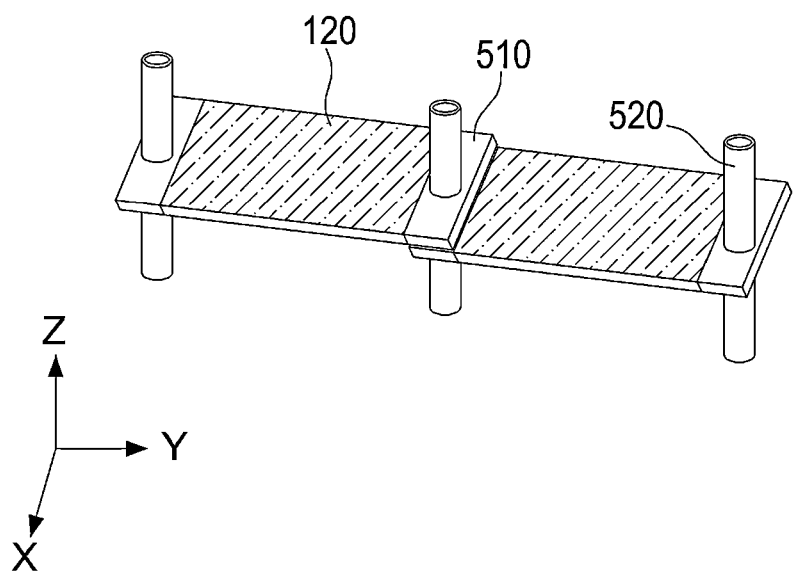

In detail, FIG. 5 is a perspective view of the photovoltaic module according to the fifth embodiment of the present disclosure, FIG. 6 is a front view of the photovoltaic module according to the fifth embodiment of the present disclosure, FIG. 7 is a side cross-sectional view of the photovoltaic module according to the fifth embodiment of the present disclosure, FIG. 8A is a partial perspective view of the photovoltaic module according to the fifth embodiment of the present disclosure, and FIG. 8B is a partial perspective view illustrating a structure that is deformed when an external force is applied to the photovoltaic module according to the fifth embodiment of the present disclosure.

Referring to FIGS. 5 to 8B together, the photovoltaic module 500 according to the fifth embodiment is different from that of the photovoltaic module 100 according to the first embodiment illustrated in FIG. 1 in an aspect of configurations of extension parts 510, impact absorption parts 520, and conductors 530, and the extension parts 510, the impact absorption parts 520, and the conductors 530 will be described in detail later in the description of the photovoltaic module 500 according to the fifth embodiment.

The extension parts 510 may be disposed on opposite ends of the plurality of solar cells 120, respectively. The extension parts 510 have elasticity, and it is preferable that they include a polymer having elasticity.

Here, referring to FIGS. 5 and 6, the extension parts 510 of the solar cells 120, which are adjacent to each other in the "Y" axis direction, may be disposed to overlap each other. That is, in the plurality of solar cells 120 disposed in a row in the "Y" axis direction, the extension parts 510 may be disposed to be mutually skew.

The impact absorption parts 520 may be formed of an elastic body shape of a spring, sponge, or a foam form, and may have a cylindrical shape, and may be formed of various materials, by which the external impact may be absorbed or offset, and it is preferable that it is formed of an insulating material.

Here, the impact absorption parts 520 may be formed of a material having a high modulus of elasticity as compared with the solar cells 120, and may absorb and offset the external impact.

The impact absorption parts 520 may pass through the pair of overlapping extension parts 510 to connect the adjacent solar cells 120. That is, the adjacent solar cells 120 may be rotated about the impact absorption parts 520.

Meanwhile, the impact absorption parts 520 is coupled to the pair of overlapping extension parts 510 through interference-fitting or separate frictional members (not illustrated), respectively, and thus may be fixed while not moved without an external force. That is, when being applied from an outside, the external force may be delivered to the impact absorption parts 520 while not directly influencing the solar cells 120, and thus, the solar cells 120 that are adjacent to each other with respect to the impact absorption parts 520 may be rotated to offset the external impact.

Meanwhile, the solar cells 120 that are connected to each other through the impact absorption parts 520 are disposed in the encapsulation part 110 to be retrained from being rotated by a degree that is more than necessary, and the external force may be offset as the solar cells 120 are moved, the external force is delivered to the impact absorption parts 520, and the external force is delivered to the encapsulation part 110.

Meanwhile, the plurality of solar cells 120 may be connected to each other for a plurality of rows (a first row, a second row, and a third row) in the "Z" axis direction (the height direction) that is perpendicular to the "Y" axis direction.

The conductors 530 include a first conductor 531 and a second conductor 532, and the first conductor 531 and the second conductor 532 are fixed through the impact absorption parts 520, and electrically connect the solar cells 120 that are adjacent to each other in the "Z" axis direction and the "Y" axis direction.

The first conductor 531 may connect the solar cells 120 that are disposed in an upward/downward direction, through the impact absorption parts 520 in the "Z" axis direction, in parallel, and the second conductor 532 may connect the solar cells 120 that are disposed in a leftward/rightward direction, through the impact absorption parts 520 in the "Y" axis direction, in series.

Here, a first electrode may be disposed at upper ends of the solar cells 120, and a second electrode that is different from the first electrode may be disposed at lower ends thereof.

The above detailed description is illustrative of the present disclosure. Furthermore, the foregoing is intended to illustrate preferred embodiments of the present disclosure, and the present disclosure may be used in various other combinations, modifications, and environments. That is, changes or modifications may be made within the scope of the inventive concept disclosed in this specification, a scope equivalent to the written disclosure, and/or within the scope of technology or knowledge in the art. The written embodiments illustrate the best state for implementing the technical idea of the present disclosure, and various changes required for specific application fields and uses of the present disclosure are also possible. Accordingly, the detailed description of the present disclosure above is not intended to limit the present disclosure to the disclosed embodiments. Additionally, the appended claims should be construed to include other embodiments as well.

DESCRIPTION OF REFERENCE NUMERALS

100: photovoltaic module
110: encapsulation part
120: solar cells
130: impact absorption parts

The invention claimed is:

1. A photovoltaic module comprising:
an encapsulation part;
a plurality of solar cells disposed in the encapsulating part such that angles thereof with respect to a height direction of the encapsulation part is 30 degrees to 90 degrees;
impact absorption parts connecting the plurality of solar cells in the height direction and a horizontal direction being perpendicular to the height direction, in the encapsulation part; and
extension parts disposed at opposite ends of the plurality of solar cells,
wherein the impact absorption parts pass through the extension parts to connect the plurality of solar cells, and
wherein the solar cells being adjacent to each other are rotatable about the impact absorption parts when an external force is applied thereto.

2. The photovoltaic module of claim 1, further comprising:
conductors disposed in the impact absorption parts, and electrically connecting the adjacent solar cells,
wherein the plurality of adjacent solar cells are connected to each other in series or in parallel through the conductors.

* * * * *